United States Patent
Cho et al.

(10) Patent No.: US 10,771,223 B2
(45) Date of Patent: Sep. 8, 2020

(54) METHOD AND APPARATUS FOR ALLOCATING AND SIGNALING ACK/NACK RESOURCES IN A WIRELESS COMMUNICATION SYSTEM

(71) Applicant: Samsung Electronics Co., Ltd., Gyeonggi-do (KR)

(72) Inventors: Joon-Young Cho, Gyeonggi-do (KR); Ju-Ho Lee, Gyeonggi-do (KR); Yong-Jun Kwak, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 16/048,895

(22) Filed: Jul. 30, 2018

(65) Prior Publication Data

US 2018/0337761 A1 Nov. 22, 2018

Related U.S. Application Data

(63) Continuation of application No. 15/180,803, filed on Jun. 13, 2016, now Pat. No. 10,038,542, which is a (Continued)

(30) Foreign Application Priority Data

Jan. 10, 2007 (KR) .................. 10-2007-0003038
Mar. 21, 2007 (KR) .................. 10-2007-0027626
(Continued)

(51) Int. Cl.
*H04L 5/00* (2006.01)
*H04L 1/16* (2006.01)
(Continued)

(52) U.S. Cl.
CPC .......... *H04L 5/0055* (2013.01); *H04L 1/1607* (2013.01); *H04L 1/1671* (2013.01);
(Continued)

(58) Field of Classification Search
CPC ... H04L 1/1861; H04L 5/0055; H04L 1/1607; H04L 1/1671; H04L 1/1867;
(Continued)

(56) References Cited

U.S. PATENT DOCUMENTS 7,496,058 B2   2/2009  Kim et al.
8,107,426 B2 *  1/2012  Cho ...................... H04L 1/1607
                                                      370/329
(Continued)

FOREIGN PATENT DOCUMENTS

CN       1722652      1/2006
EP       2 081 310    7/2009
(Continued)

OTHER PUBLICATIONS

Ericsson, "Persistent Scheduling for E-UTRA", R1-060099, TSG-RAN WG1 LTE AdHoc, Jan. 19, 2006.
(Continued)

*Primary Examiner* — Steven H Nguyen
(74) *Attorney, Agent, or Firm* — The Farrell Law Firm, P.C.

(57) ABSTRACT

Methods and apparatus are provided for determining acknowledgement/negative acknowledgement (ACK/NACK) resources at a user equipment (UE) in a wireless communication system. Control information is received on a downlink control channel for data transmission and the control information is decoded. It is determined whether a scheduling type of a data channel for the data transmission is persistent or non-persistent based on the decoded downlink control information. A resource for transmission of an ACK/NACK is determined based on the determined scheduling type of the data channel.

16 Claims, 13 Drawing Sheets

Related U.S. Application Data continuation of application No. 13/337,853, filed on Dec. 27, 2011, now Pat. No. 9,369,243, which is a continuation of application No. 11/972,372, filed on Jan. 10, 2008, now Pat. No. 8,107,426.

(30) Foreign Application Priority Data

May 4, 2007 (KR) .......................... 10-2007-0043785
May 25, 2007 (KR) .......................... 10-2007-0051059

(51) Int. Cl.
*H04L 1/18* (2006.01)
*H04W 72/04* (2009.01)

(52) U.S. Cl.
CPC .......... *H04L 1/1861* (2013.01); *H04L 1/1867* (2013.01); *H04L 1/1896* (2013.01); *H04L 5/0053* (2013.01); *H04L 5/0057* (2013.01); *H04L 5/0091* (2013.01); *H04W 72/042* (2013.01); *H04L 1/1887* (2013.01); *H04L 5/006* (2013.01); *H04L 5/0007* (2013.01); *H04L 5/0064* (2013.01); *H04W 72/04* (2013.01)

(58) Field of Classification Search
CPC ... H04L 1/1887; H04L 1/1896; H04L 5/0007; H04L 5/0053; H04L 5/0057; H04L 5/006; H04L 5/0064; H04L 5/0091; H04W 72/042; H04W 72/04
See application file for complete search history.

(56) References Cited

U.S. PATENT DOCUMENTS

| | | | |
|---|---|---|---|
| 9,369,243 B2 * | 6/2016 | Cho | H04L 1/1607 |
| 10,038,542 B2 * | 7/2018 | Cho | H04L 1/1607 |
| 2004/0081123 A1 | 4/2004 | Krishnan et al. | |
| 2004/0266466 A1 | 12/2004 | Kim et al. | |
| 2005/0249120 A1 | 11/2005 | Heo et al. | |
| 2005/0282549 A1 | 12/2005 | Kim et al. | |
| 2006/0205414 A1 | 9/2006 | Teague | |
| 2007/0009054 A1 | 1/2007 | Kwak et al. | |
| 2007/0019596 A1 | 1/2007 | Barriac et al. | |
| 2007/0026865 A1 | 2/2007 | Yano et al. | |
| 2007/0133458 A1 | 6/2007 | Chandra et al. | |
| 2007/0211668 A1 | 9/2007 | Agrawal et al. | |
| 2007/0211745 A1 | 9/2007 | Deshpande et al. | |
| 2007/0217370 A1 | 9/2007 | Soong et al. | |
| 2007/0242653 A1 | 10/2007 | Yang et al. | |
| 2007/0291691 A1 | 12/2007 | Gorokhov | |
| 2008/0045272 A1 | 2/2008 | Wang et al. | |
| 2008/0080422 A1 | 4/2008 | Frederiksen et al. | |
| 2008/0085718 A1 | 4/2008 | Kuchibhotla et al. | |
| 2008/0117891 A1 | 5/2008 | Damnjanovic | |
| 2008/0259855 A1 | 10/2008 | Yoon et al. | |
| 2009/0022098 A1 | 1/2009 | Novak | |
| 2009/0262655 A1 | 10/2009 | Harada et al. | |
| 2009/0285163 A1 | 11/2009 | Zhang | |
| 2010/0002640 A1 | 1/2010 | Gorokhov et al. | |
| 2010/0238870 A1 | 9/2010 | Mitra et al. | |
| 2011/0032887 A1 | 2/2011 | Kishiyama et al. | |

FOREIGN PATENT DOCUMENTS

| | | |
|---|---|---|
| JP | 2007-520169 | 7/2007 |
| JP | 2007-524269 | 8/2007 |
| JP | 2008-526090 | 7/2008 |
| JP | 2009-540626 | 11/2009 |
| KR | 1020060134853 | 12/2006 |
| RU | 2207723 | 6/2003 |
| WO | WO 97/23108 | 6/1997 |
| WO | WO 2004/028050 | 4/2004 |
| WO | WO 2004/072673 | 8/2004 |
| WO | WO 2004/114582 | 12/2004 |
| WO | WO 2005/074184 | 8/2005 |
| WO | WO 2006/071049 | 7/2006 |
| WO | WO 2006/114689 | 11/2006 |
| WO | WO 2007/055310 | 5/2007 |
| WO | WO 2009/022704 | 2/2009 |

OTHER PUBLICATIONS

NEC Group, "Resource Allocation Signalling for E-UTRA", R1-061308, TSG-RAN WG1#45, May 8, 2006..
Rapporteur (Motorola), "Report of E-Mail Discussion: DL Scheduling", R2-063684, TSG-RAN WG2, Dec. 12, 2006.
Philips, "Reduction of HS-DPCCH Power Requirements", R1-02-1085, 3GPP TSG RAN WG1#28, Aug. 19-22, 2002, 8 pages.
European Search Report dated Jul. 3, 2015 issued in counterpart application No. 15160009.5-1851, 7 pages.
Chinese Office Action dated Dec. 25, 2015 issued in counterpart application No. 201310316472.3, 11 pages.
Damnjanovic, U.S. Appl. No. 60/839,466, filed Aug. 2006, 8 pages.
Wang, U.S. Appl. No. 60/839,110, filed Aug. 2006, 9 pages.

* cited by examiner

METHOD AND APPARATUS FOR ALLOCATING AND SIGNALING ACK/NACK RESOURCES IN A WIRELESS COMMUNICATION SYSTEM

PRIORITY

This application is a continuation application of U.S. patent application Ser. No. 15/180,803, filed in the U.S. Patent and Trademark Office (USPTO) on Jun. 13, 2016, which is a continuation application of U.S. patent application Ser. No. 13/337,853, filed in the USPTO on Dec. 27, 2011, now U.S. Pat. No. 9,369,243, issued on Jun. 14, 2016, which is a continuation application of U.S. patent application Ser. No. 11/972,372, filed in the USPTO on Jan. 10, 2008, now U.S. Pat. No. 8,107,426, issued on Jan. 31, 2012, which claims priority under 35 U.S.C. § 119(a) to a Korean Patent Application filed in the Korean Intellectual Property Office (KIPO) on Jan. 10, 2007 and assigned Ser. No. 10-2007-0003038, a Korean Patent Application filed in the KIPO on Mar. 21, 2007 and assigned Ser. No. 10-2007-0027626, a Korean Patent Application filed in the KIPO on May 4, 2007 and assigned Ser. No. 10-2007-0043785, and a Korean Patent Application filed in the KIPO on May 25, 2007 and assigned Ser. No. 10-2007-0051059, the contents of which are incorporated herein by reference.

BACKGROUND OF THE INVENTION

1. Field of the Invention

The present invention generally relates to a wireless communication system. More particularly, the present invention relates to a method and apparatus for transmitting and receiving an Acknowledgment/Negative Acknowledgment (ACK/NACK) for Hybrid Automatic Repeat reQuest (HARD).

2. Description of the Related Art

There are two main error control schemes in a data transmission system, Forward Error Correction (FEC) and Automatic Repeat reQuest (ARQ). An FEC system attempts to correct errors in received data. If the error correction is successful, the correct data is decoded. If the error correction has failed, the wrong data is provided to a user or the data is lost. In an ARQ system, a transmitter transmits data using an FEC code with a good error correction capability and if an error is detected from the received data, a receiver requests retransmission to the transmitter.

FEC is relatively less efficient in a good channel environment and if error correction has failed, it decreases system reliability. On the other hand, ARQ has the advantages of high system reliability and efficient transmission with low redundancy, but it causes frequent retransmission requests in a poor channel environment, thus significantly decreasing system efficiency. To overcome these shortcomings, HARQ was proposed by combining FEC and ARQ in an appropriate manner.

HARQ is a scheme that attempts to correct errors in a received coded data (a HARQ packet). It determines from a simple error detection code such as a Cyclic Redundancy Check (CRC) whether to request retransmission of the HARQ packet. After determining the presence or absence of errors in the received HARQ packet, the receiver feeds back an ACK or NACK to the transmitter. The transmitter retransmits the HARQ packet or transmits a new HARQ packet according to the ACK or NACK.

The receiver uses appropriate radio resources for the ACK/NACK transmission. The ACK/NACK is transmitted on a few subcarriers in an Orthogonal Frequency Division Multiplexing (OFDM) wireless communication system and on a predetermined code channel in a Wideband Code Division Multiple Access (WCDMA) system. In general, HARQ packets are transmitted simultaneously to a plurality of users for one Transmission Time Interval (TTI). Therefore, ACKs/NACKs are also transmitted simultaneously for the HARQ packets.

When a Node B allocates downlink data channels to User Equipments (UEs), it also allocates control channel resources in which the UEs will transmit ACK/NACKs for the downlink data channels. For uplink data transmission, the Node B receives uplink packet data from the UEs on uplink data channels and then transmits ACK/NACKs for the packet data in resources agreed between the Node B and the UEs.

In general, limited resources are available to a system and the system resources should be appropriately divided for channels including data channels and ACK/NACK CHannels (ACKCHs). Hence, it is significant to allocate as much resources as needed for a given TTI to the ACKCHs. To describe the resource allocation, an Enhanced Universal Terrestrial Radio Access (EUTRA)-OFDM downlink frame structure is shown in FIG. 1, by way of example. UTRA is the future-generation mobile communication standards of the $3^{rd}$ Generation Partnership Project (3GPP).

Referring to FIG. 1, a system bandwidth 101 is 10 MHz and a total of 50 Resource Blocks (RBs) 102 are defined in the system bandwidth 101. Each RB 102 includes 12 subcarriers and each 1-ms TTI 105 has 14 OFDM symbol intervals 104. One downlink data channel can be formed with one or more RBs.

In the downlink frame structure of FIG. 1, up to 50 downlink data channels can be scheduled at the same time for one TTI 105. Accordingly, up to 50 uplink ACKCHs are required. In real implementation, 10 or 20 data channels are scheduled for one TTI on average and as many uplink ACKCHs are needed for the data channels. Since the number of available ACKCHs is very different from the average number of actually used ACKCHs, an efficient resource allocation is important.

If the Node B explicitly notifies UEs of ACKCHs established for data channels in every TTI, only as many ACKCHs as needed can be allocated for the TTI. Thus, for downlink data transmission, the UEs transmit ACK/NACKs in the notified ACK/NACK resources. For uplink data transmission, the UEs detect ACK/NACKs transmitted by the Node B from ACK/NACK resources signaled by the Node B. Hence, it is significant to reduce the amount of resources for the signaling, i.e. signaling overhead. The explicit signaling of information about ACK/NACK resources from the Node B to the UEs for each TTI results in a large signaling overhead.

Accordingly, there exists a need for optimizing the amount of resources allocated to ACKCHs and the overhead of signaling the ACK/NACK resources in order to increase system capacity through efficient use of radio resources.

SUMMARY OF THE INVENTION

An aspect of exemplary embodiments of the present invention is to address at least the problems and/or disadvantages and to provide at least the advantages described below. Accordingly, an aspect of the present invention is to provide a resource allocation method and apparatus for optimizing the amount of ACK/NACK resources in a wireless communication system.

Another aspect of the present invention is to provide a method and apparatus for optimizing the overhead of signaling information about ACK/NACK resources in a wireless communication system.

A further aspect of the present invention is to provide a method and apparatus for signaling information about ACK/NACK resources in a different manner depending on whether data channel resources are scheduled persistently or non-persistently in a wireless communication system.

In accordance with an aspect of the present invention, a method is provided for determining ACK/NACK resources at a UE in a wireless communication system. Control information is received on a downlink control channel for data transmission and the control information is decoded. It is determined whether a scheduling type of a data channel for the data transmission is persistent or non-persistent based on the decoded downlink control information. A resource for transmission of an ACK/NACK is determined based on the determined scheduling type of the data channel.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

Figure 1:
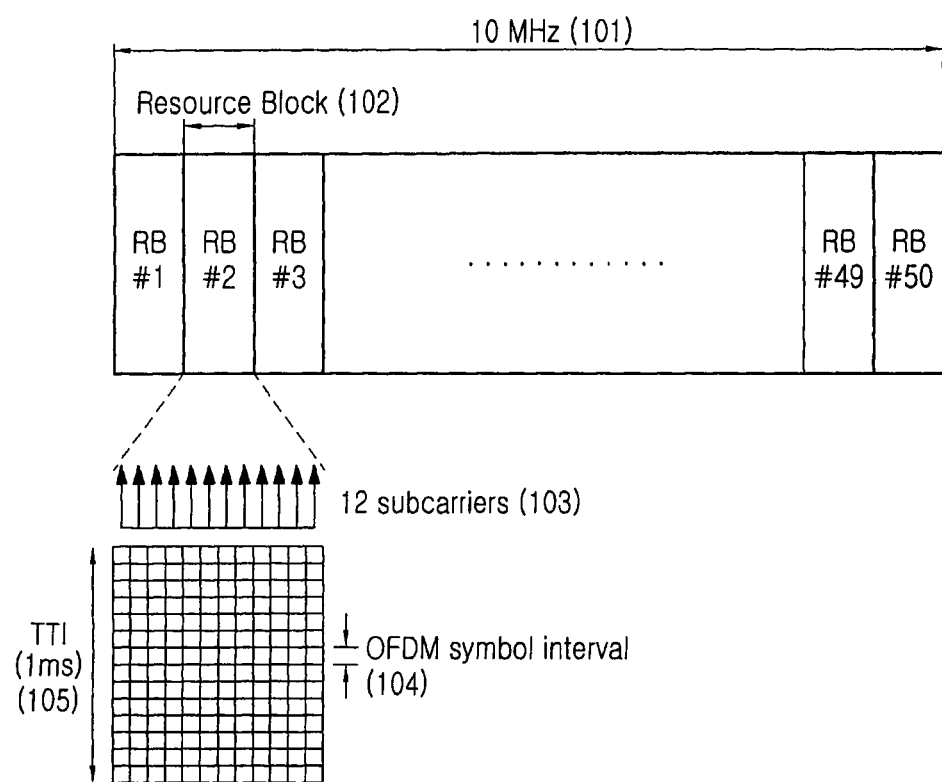
FIG. 1 illustrates an exemplary downlink resource structure

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

While exemplary embodiments of the present invention will be described in the context of an OFDM cellular wireless communication system, particularly an EUTRA system based on 3GPP Universal Mobile Telecommunication Services (UMTS), it is to be clearly understood by those skilled in the art that the subject matter of the present invention is also applicable to other communication systems having similar technological backgrounds and channel structures with slight modifications within the scope and spirit of the present invention.

The present invention pertains to efficient allocation and signaling of channel resources in a wireless communication system. In accordance with the present invention, a different signaling scheme is used for ACK/NACK resource allocation depending on the scheduling type of data channels. Data channels can be scheduled in two ways according to the characteristics of data traffic.

For irregular data transmission such as Internet browsing or when using a gaming service, a Node B selects appropriate radio resources and an appropriate TTI for the data transmission, each time data is generated. When transmitting the data, the Node B signals scheduling information indicating the selection result to a UE on a Scheduling Control CHannel (SCCH). This scheduling type is called non-persistent scheduling.

For almost real-time or regular data traffic such as Voice over Internet Protocol (VoIP), the Node B does not need to select resources for the data transmission in every TTI and notify the UE of the selected resources. Hence, scheduling information about the resource allocation for the data traffic is signaled once at an initial scheduling and is valid for the subsequent data transmissions. The validity of the scheduling information lasts persistently or for a predetermined time. This scheduling type in which scheduling information is valid for a plurality of TTIs or for a plurality of data packets is called persistent scheduling.

Depending on the persistent or non-persistent scheduling type for data transmission, ACK/NACK resources are allocated and signaled in a different manner in the present invention. More specifically, for non-persistently scheduled data transmission, ACK/NACK resources are indicated by the index of an SCCH. For persistently scheduled data transmission, ACK/NACK resources are explicitly notified during an initial scheduling and are still valid afterwards. Since ACK/NACK resource allocation depends on the data scheduling type, the use efficiency of the entire resources is increased and the signaling overhead of the ACK/NACK resources is decreased.

In a MIMO scheme in which a plurality of codewords can be transmitted simultaneously through a plurality of transmit/receive antennas on a single data channel, two or more ACKCHs are needed for the codewords. In this context, the present invention provides a method for allocating ACK/NACK resources and signaling the allocated ACK/NACK resources, which suits for MIMO transmission.

As used herein, the term "ACK/NACK resources" is defined as resources allocated for an ACKCH.

Embodiment 1

Figure 2:
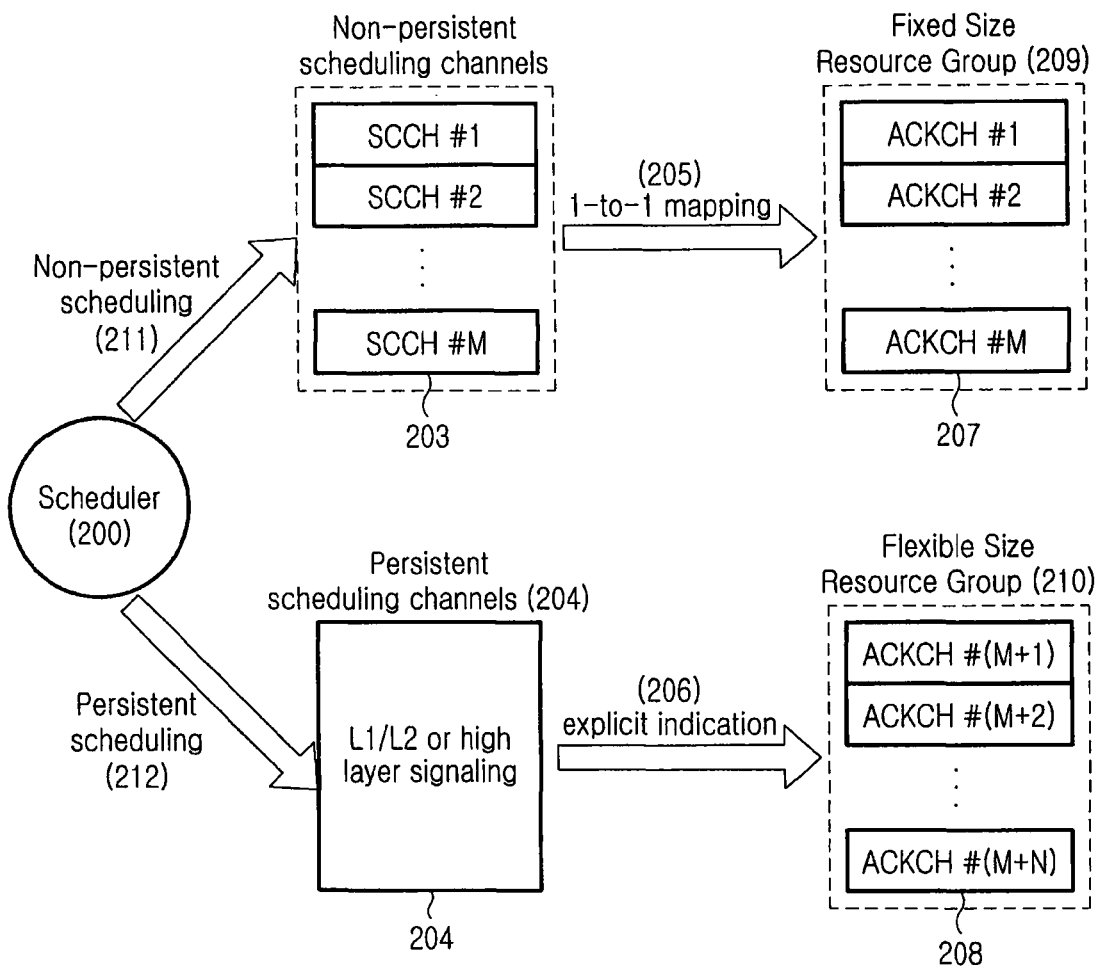
FIG. 2 illustrates an ACK/NACK resource allocation scheme according to the present invention.

FIG. 2 illustrates an ACK/NACK resource allocation scheme according to the present invention.

Referring to FIG. 2, a Node B scheduler 200 selects non-persistent scheduling 211 or persistent scheduling 212 for data channels.

In the non-persistent scheduling 211, M SCCHs 203 deliver scheduling information about M data channels. Each SCCH is a physical layer control channel carrying scheduling information about one data channel. ACK/NACK resources in which an ACK/NACK is transmitted for a data channel are implicitly indicated by the index of an SCCH 203 mapped to the data channel. Hence, different data channels, that is, different SCCHs 203 are one-to-one mapped to ACKCHs 207 within a fixed-size resource group 209, as indicated by reference numeral 205.

The simplest mapping rule is that SCCH # n is mapped to ACKCH # n, although other mapping rules are also available. This mapping between the SCCHs 203 and the ACKCHs 207 obviates the need for the Node B's explicit signaling of the indexes of the ACKCHs 207 to UEs, thereby reducing signaling overhead.

Meanwhile, in order to define SCCHs of various formats and sizes, Control Channel Elements (CCEs) each having a predetermined number of subcarriers are defined and labeled with CCE indexes. An SCCH can be formed with one or more CCEs. Then, the index of a CCE (or CCEs) forming an SCCH is mapped to ACK/NACK resources, instead of the index of the SCCH. Thus a UE can find out the index of an allocated ACKCH from the index of the CCE forming the SCCH without separate signaling of the index of the ACKCH. In this manner, ACK/NACK resources for non-persistently scheduled data are implicitly signaled by the indexes of CCEs, instead of the indexes of the SCCHs 203. If an SCCH includes a plurality of CCEs, one of the CCE indexes, for example, the lowest CCE index can be mapped to ACK/NACK resources.

The illustrated case of FIG. 2 is based on the assumption that up to M data channels can be scheduled for one TTI. The number of scheduled data channels for each TTI may vary according to a decision of the Node B scheduler 200, which in turn may change the numbers of the SCCHs 203 and the ACKCHs 207. For the non-persistent scheduling 211, the resource group 209 is preset for as many or more ACKCHs for a maximum allowed number of data channels to thereby enable rapid allocation of ACK/NACK resources without explicit signaling.

In the persistent scheduling 212, once resources are scheduled for data channels using SCCHs 204 at an initial data transmission, scheduling information about the resources is valid persistently or for a predetermined number of following TTIs, without transmission of new scheduling information.

However, considering the number of persistently scheduled UEs is different in each cell and the number of persistently scheduled data channels is also different in each TTI, the Node B explicitly transmits to UEs resource indication information indicating ACKCHs 208 within a flexible-size resource group 210 in the persistent scheduling 212, as indicated by reference numeral 206. The resource indication information is still valid to the UEs afterwards as long as the same resource allocation is maintained for data.

When needed, for example, to gather ACK/NACK resources scattered across RBs, it is possible to reallocate ACK/NACK resources for a persistently scheduled data channel by additional signaling during a service. The ACK/NACK resource reallocation can be indicated by high-layer signaling information transmitted on a persistently scheduled data channel. A UE acquires ACK/NACK resource indication information from the high-layer signaling information and transmits an ACK/NACK for a data channel received later in the resources indicated by the ACK/NACK resource indication information.

As illustrated in FIG. 2, the ACK/NACK resource indication information for the persistently scheduled data channels is signaled by Layer 1 (L1)/Layer 2 (L2) on control channels or by high-layer protocol information, as indicated by reference numeral 206. Even when persistent scheduling information about the data channels is transmitted by L1/L2 signaling, the ACK/NACK resource indication information can be transmitted by high-layer signaling. Since transmission of initial scheduling information suffices in the persistent scheduling 212, explicit signaling of ACK/NACK indication information does not cause a great increase in signaling overhead even though as much ACK/NACK resources as needed are allocated for each TTI.

In the persistent scheduling 212, data is transmitted in persistently scheduled resources during an Initial HARQ transmission. If the initially transmitted data has errors, the Node B can explicitly schedule data channel resources for an HARQ retransmission. Hence, an ACK/NACK is transmitted for the retransmitted data on an ACKCH 207 within the fixed-size resource group 209, implicitly mapped to the index of an SCCH 203 that schedules a data channel during the HARQ retransmission. Alternatively, the ACK/NACK can be transmitted on the same or a different ACKCH from a previous persistently scheduled ACKCH in the flexible-size resource group 210. Therefore, the ACK/NACK resources used for the Initial HARQ transmission can be utilized for other channels.

For example, in the case where an ACK/NACK is transmitted on an ACKCH 207 mapped to the index of an SCCH that schedules data resources or the index of a CCE forming the SCCH during an HARQ retransmission, ACK/NACK resources allocated for a persistently scheduled data channel for a UE are confined to an Initial HARQ transmission only. Since the Node B can allocate the ACK/NACK resources allocated for the initial HARQ transmission to ACKCHs of other UEs or other channels of the UE, resource use efficiency is improved. In other words, ACK/NACK resources allocated persistently by persistent data scheduling are valid only for the Initial HARQ transmission and the ACK/NACK resources implicitly indicated by the SCCH are used for ACK/NACK transmission during the HARQ retransmission.

The above-described ACK/NACK resource allocation applies to both the downlink and the uplink. For downlink data transmission, the SCCHs 203 and 204 carry resource allocation information about downlink data from the Node B to the UEs and the ACKCHs 207 and 208 deliver ACKs/NACKs for the downlink data from the UEs to the Node B. For uplink data transmission, the SCCHs 203 and 204 deliver resource allocation information about uplink data that the UEs will transmit to the Node B and the ACKCHs 207 and 208 carry ACK/NACKs for the uplink data from the Node B to the UEs.

Figure 3:
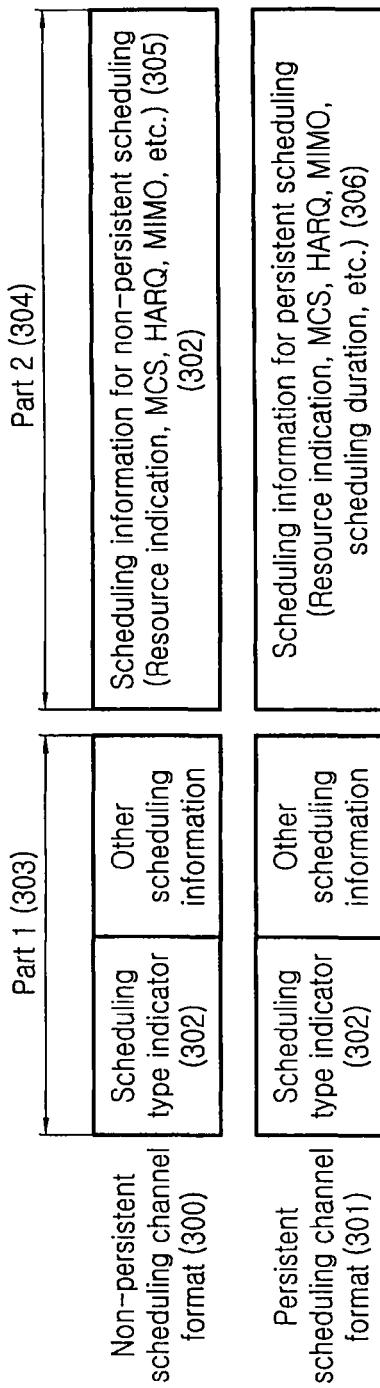
FIG. 3 illustrates scheduling physical channel formats according to the present invention.

FIG. 3 is an exemplary downlink scheduling physical channel format according to the present invention, when persistent scheduling information is transmitted by L1/L2 signaling like non-persistent scheduling information. Reference numeral 300 denotes the information format of a non-persistent SCCH and reference numeral 301 denotes the information format of a persistent SCCH.

Referring to FIG. 3, a UE receives and decodes a first part 303 (Part 1) of an SCCH and determines, based on a scheduling type indicator 302, whether the SCCH is for non-persistent scheduling or persistent scheduling. The UE acquires scheduling information 305 or 306 by receiving and decoding a second part 304 (Part 2) according to the scheduling type indicator 302. The scheduling information 305 or 306 includes resource indication information indicating resources allocated for a data channel, the Modulation and Coding Scheme (MCS) level of the data channel, HARQ information, and MIMO information.

Compared to the non-persistent scheduling information 305, the persistent scheduling information 306 further includes ACK/NACK resource indication information and scheduling duration information indicating a duration for which the persistent scheduling information 306 is valid. It can be further contemplated that the non-persistent SCCH format 300 is identical to the persistent SCCH format 301 and the scheduling duration information and the ACK/NACK indication information are transmitted separately by L1/L2 signaling or high-layer signaling.

When an initial transmission is scheduled through persistent scheduling and signaled by L1/L2 signaling, ACK/NACK resources can be implicitly indicated by an SCCH as in non-persistent scheduling. ACK/NACK resources can be explicitly signaled in a persistently scheduled initial data transmission or the following data transmission that is not indicated by an SCCH, ACK/NACK resources can be explicitly signaled. For example, if persistent scheduling information is signaled to a UE on SCCH # k, the UE receives data in data channel resources indicated by SCCH # k and transmits an ACK/NACK on ACKCH # k mapped to SCCH # k for the received data. For the following data received in the data channel resources, the UE transmits ACK/NACKs for the data in ACK/NACK resources explicitly indicated by high-layer signaling information included in the data initially received in the data channel resources.

The above ACKCH use example applies to high-layer signaling of persistent scheduling information about a data channel. Since a data channel carrying initial data including the persistent scheduling information as high-layer signaling information is scheduled for a UE by an SCCH, the UE transmits an ACK/NACK in ACK/NACK resources mapped to the SCCH or a CCE forming the SCCH. After successful reception of the initial data, the UE transmits an ACK/NACK in ACK/NACK resources indicated by the high-layer signaling information included in the initial data.

Figure 4:
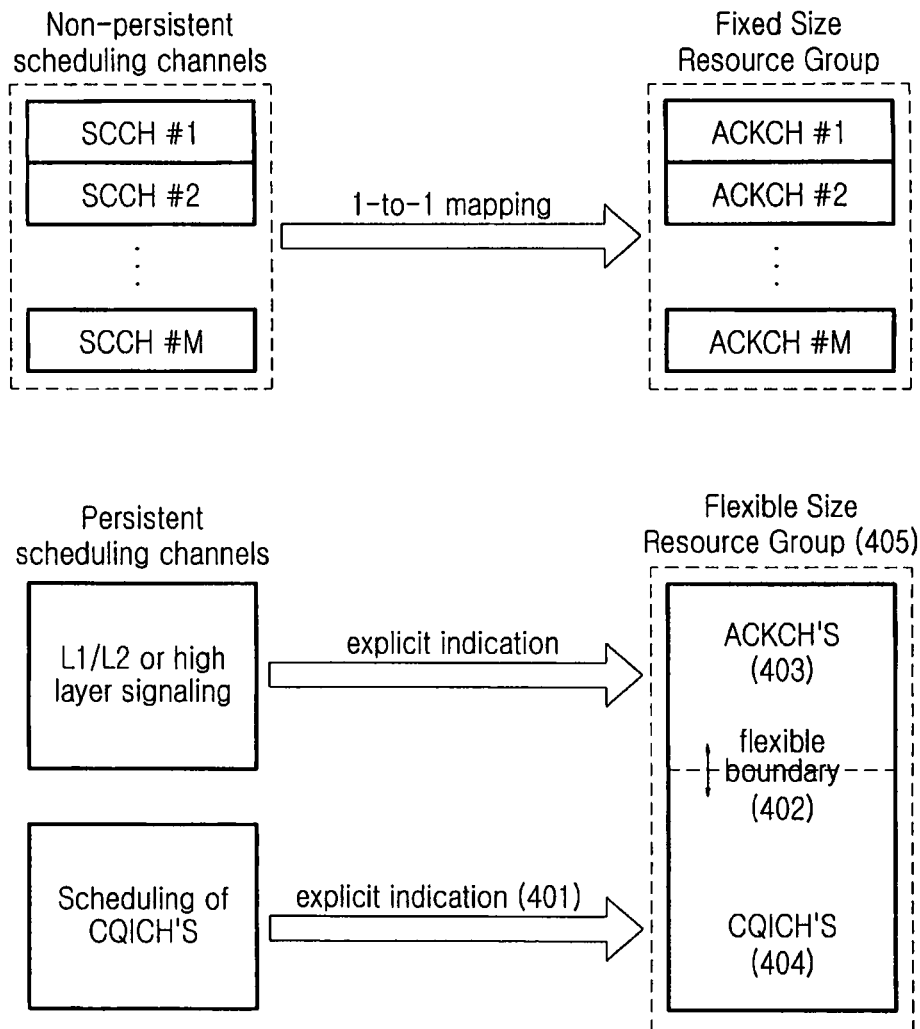
FIG. 4 illustrates another ACK/NACK resource allocation scheme according to the present invention.

FIG. 4 illustrates another ACK/NACK resource allocation scheme according to the present invention.

Referring to FIG. 4, ACKCHs 403 for persistently scheduled data channels share a resource group 405 with CQICHs 404. UEs transmit status information about downlink channels to the Node B on the CQICHs 404. The Node B explicitly indicates a transmission timing and resources for a CQICH to each UE, as indicated by reference numeral 401. Like the ACKCHs 403, the number of the CQICHs 404 may vary for each cell or for each TTI. The CQICHs 404 and the ACKCHs 403 share the flexible-size resource group 405 and the Node B controls resources allocated to the ACKCHs 403 and the CQICHs 404 within the resource group 405 by shifting a resource boundary 402 according to situations. Hence, the entire resources are efficiently used.

Figure 5:
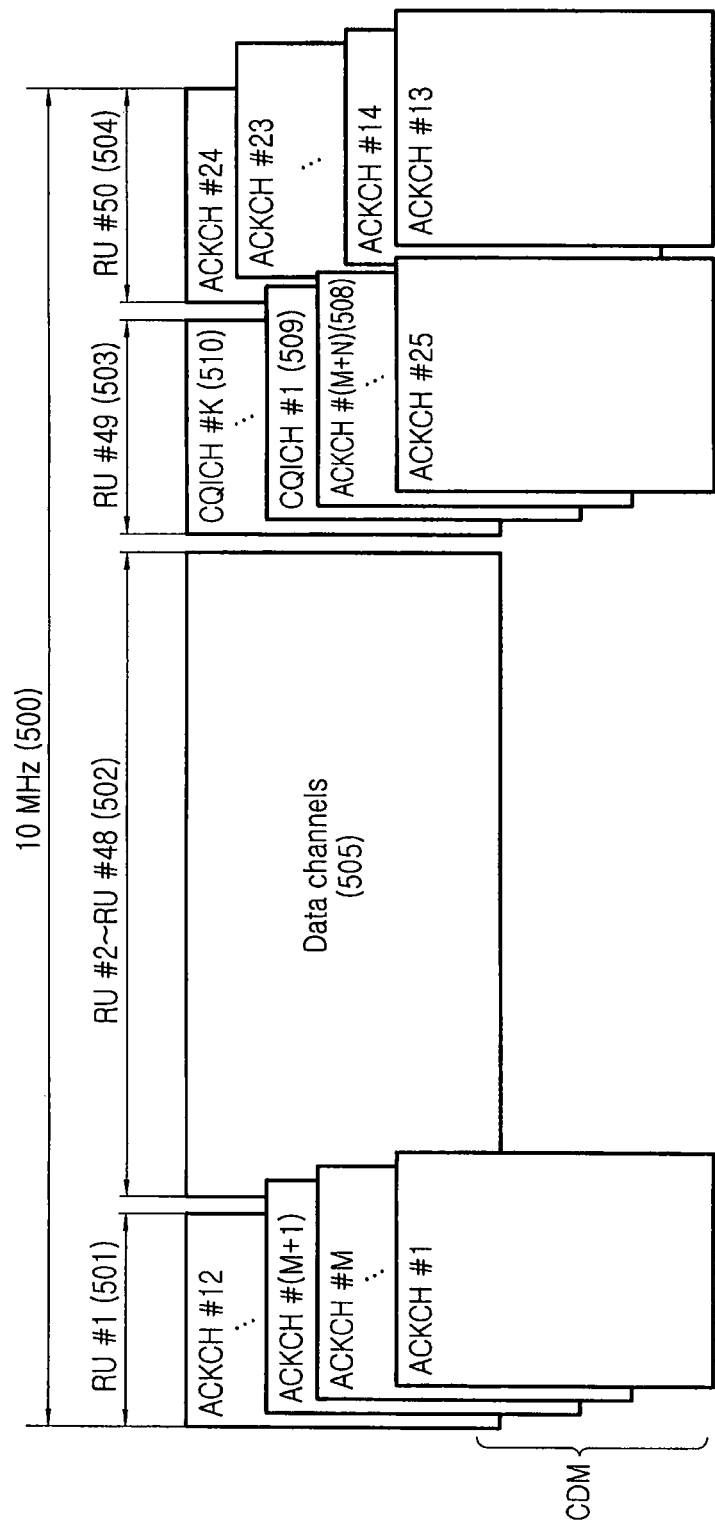
FIG. 5 illustrates an exemplary ACK/NACK resource allocation according to the present invention.

FIG. 5 illustrates an exemplary ACK/NACK resource allocation according to the present invention. The ACK/NACK resource allocation is performed in compliance with the EUTRA uplink SC-FDMA standards of the 3GPP, by way of example.

Referring to FIG. 5, a transmission bandwidth 500 of 10 MHz is divided into 50 Resource Units (RUs) 501 to 504, each RU having 12 subcarriers. ACKCHs and CQICHs are multiplexed by Code Division Multiplexing (CDM) in a first RU 501 (RU #1), a $49^{th}$ RU 503 (RU #49), and a $50^{th}$ RU 504 (RU #50) by applying different sequences or different cyclically shifted sequences of the same sequence to the ACKCHs and the CQICHs. Data channels are multiplexed with the ACKCHs and the CQICHs by Frequency Division Multiplexing (FDM) in the $2^{nd}$ to $48^{th}$ RUs 502 (RU #2 to RU #48).

M ACKCHs, ACKCH #1 to ACKCH # M, for non-persistently scheduled data channels are transmitted in RU #1 by CDM and the remaining CDM resources of RU #1 are allocated to ACKCH #(M+1) to ACKCH #12 for persistently scheduled data channels. In addition to ACKCH #(M+1) to ACKCH #12, RU #49 and RU #50 are used as ACK/NACK resources for persistently scheduled data channels. In a TTI with a small number of persistently scheduled data channels, RU #49 and RU #50 are used for data channels along with the data channels 505 of RU #2 to RU #48, or they are dedicated to CQICHs.

While RU #49 is allocated to $1^{st}$ to $K^{th}$ CQICHs 509 to 510 (CQICH #1 to CQICH # K) in FIG. 5, there is no need for drawing a boundary in RU #49 and CQICHs can also be allocated in RU #50. Since the amount and indexes of ACK/NACK resources and CQICH resources are controlled on a TTI basis, as much radio resources as needed can be efficiently used.

Instead of signaling absolute values such as a cyclic shift value of a CDM sequence, an additional orthogonal sequence index, and a transmitted RU index to a UE as resource indication information about a CQICH and an ACKCH for a persistently scheduled data channel in the flexible-size resource group 405, an offset from the boundary of the fixed-size ACKCH resource group can be signaled to the UE. When each uplink channel index is defined by a combination of a cyclic shift value of a CDM sequence, an orthogonal sequence index, and a transmitted RU index as illustrated in FIG. 5, the offset refers to a relative index with respect to ACKCH # M at the boundary of the fixed-size ACKCH resource group. For instance, ACKCH #(M+m) is indicated by an offset m.

Figure 6:
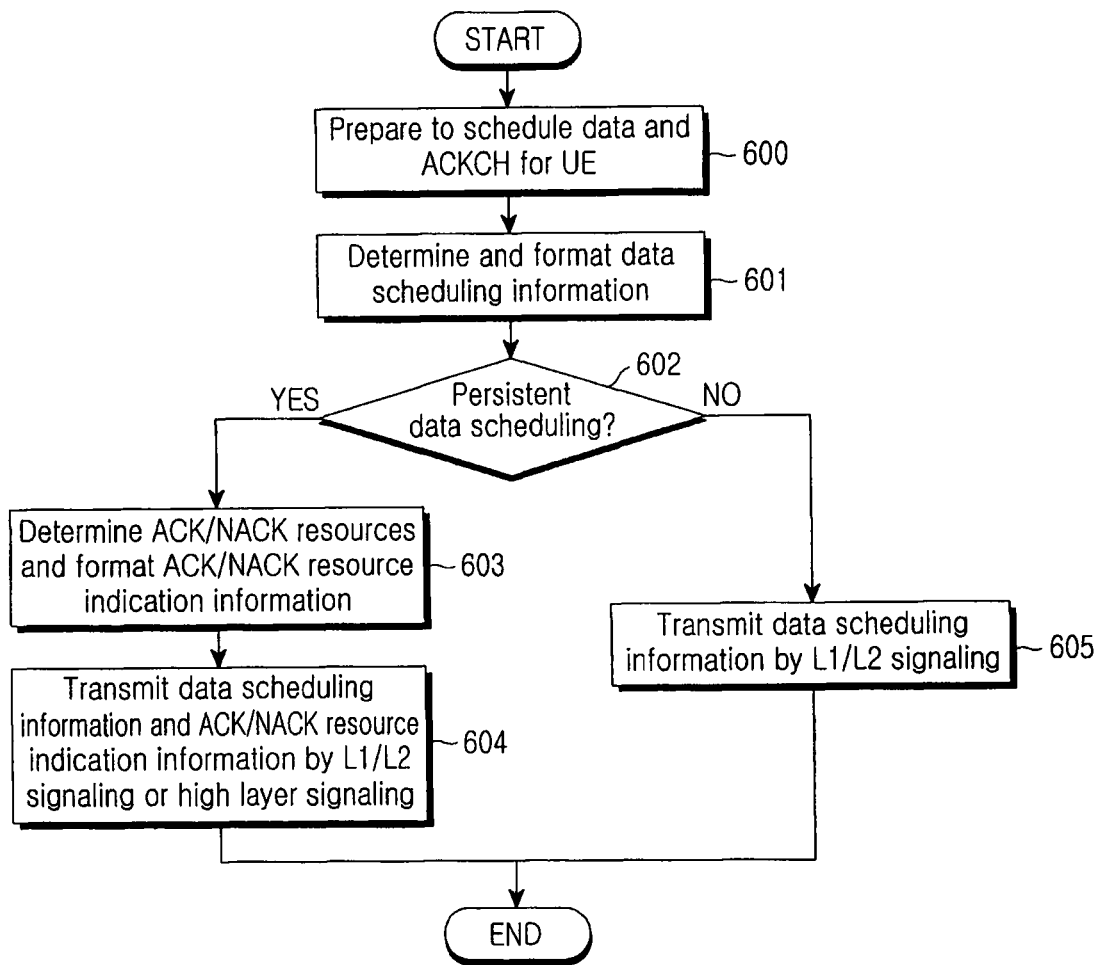
FIG. 6 is a flowchart of an operation of a Node B according to the present invention.

FIG. 6 is a flowchart of an operation of the Node B according to the present invention.

Referring to FIG. 6, the Node B prepares to schedule a downlink and/or uplink data channel and an ACKCH for a UE in step 600. Specifically, the Node B collects information required for scheduling, such as a scheduling type for data traffic, buffer status, and resource status. In step 601, the Node B determines a scheduling type for the data channel and a transport format for the data channel such as allocated resources and an MCS level, and then formats scheduling information according to the determination result.

In step 602, the Node B determines whether the scheduling type is persistent or non-persistent. In the case of the persistent scheduling, the Node B determines ACK/NACK resources and formats ACK/NACK resource indication information to notify the UE of the ACK/NACK resources in step 603. The scheduling type is determined according to the traffic characteristics of the data channel. In step 604, the Node B transmits the scheduling information of the data channel and the ACK/NACK resource indication information to the UE by L1/L2 signaling or high-layer signaling.

In the case of the non-persistent scheduling, ACK/NACK resources are determined according to the index of an SCCH mapped to the data channel. Therefore, the Node B transmits only the scheduling information of the data channel on an SCCH having an SCCH index to the UE in step 605.

Figure 7A:
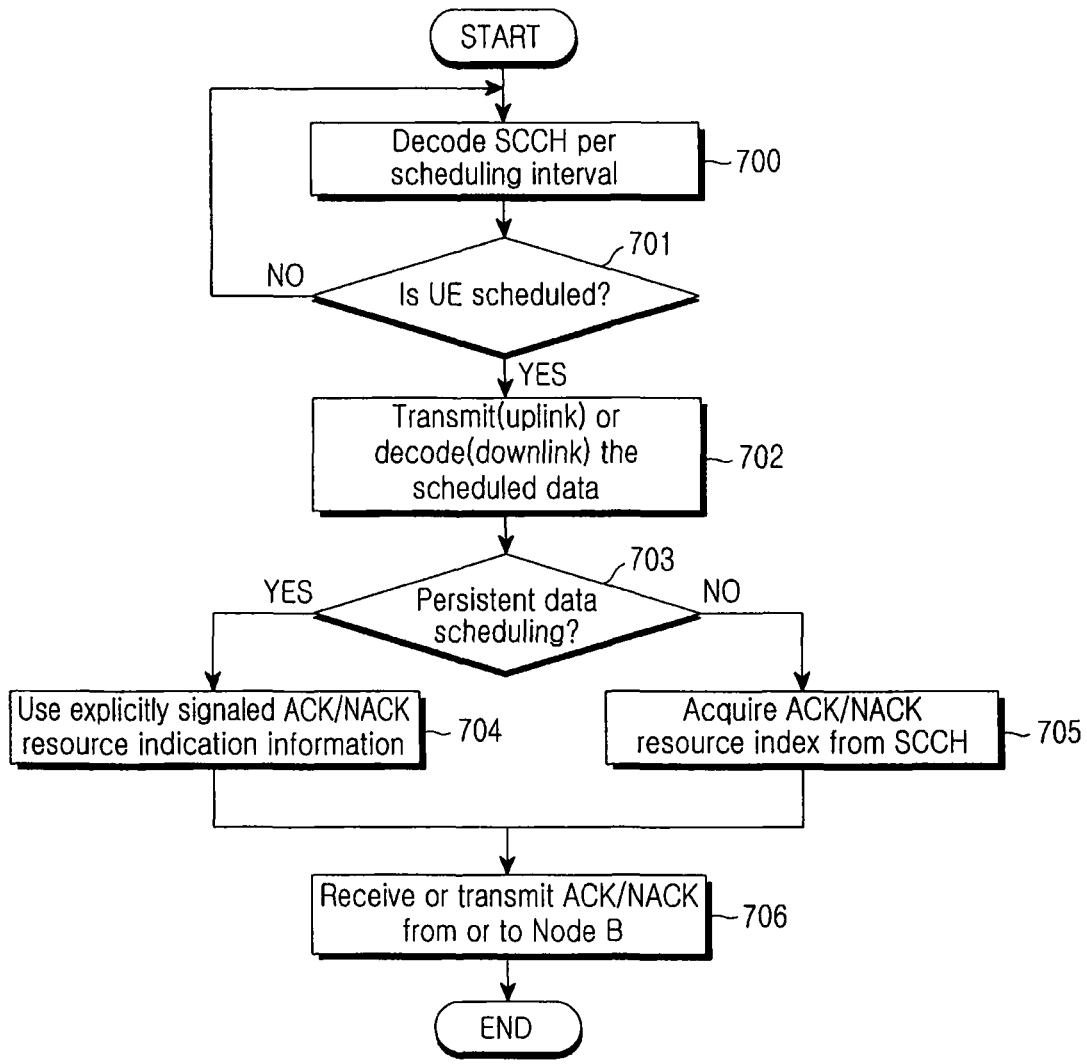
FIG. 7A is a flowchart of an operation of a UE according to the present invention.

FIG. 7A is a flowchart of an operation of the UE according to the present invention.

Referring to FIG. 7A, the UE acquires scheduling information by decoding an SCCH in every scheduling interval (e.g. in every TTI) in step 700 and determines whether there are data channel resources allocated to the UE in the current scheduling interval, that is, determines from the scheduling information whether the UE has been scheduled in the current scheduling interval in step 701. If the UE has not been scheduled, the UE returns to step 700. If the UE has been scheduled, it transmits scheduled data according to the scheduling information if uplink data transmission is scheduled or receives and decodes scheduled data according to the scheduling information if downlink data reception is scheduled.

In step 703, the UE determines whether the scheduling type of data used in FIG. 702 is persistent or non-persistent. The UE can determine the scheduling type from the scheduling type indicator of the scheduling information or the traffic characteristics of the data channel. In the case of the persistent scheduling type, the UE detects ACK/NACK resources explicitly indicated when the data is initially scheduled by persistent scheduling in step 704 and transmits an ACK/NACK to the Node B in the ACKCH resources if the downlink data reception is scheduled or receives an ACK/NACK in the ACKCH resources from the Node B if the uplink data transmission is scheduled in step 706.

In the case of the non-persistent scheduling type, the UE detects ACK/NACK resources implicitly mapped to the SCCH corresponding to the non-persistently scheduled data channel in step 705 and transmits or receives an ACK/NACK to or from the Node B in the ACK/NACK resources in step 706.

Figure 7B:
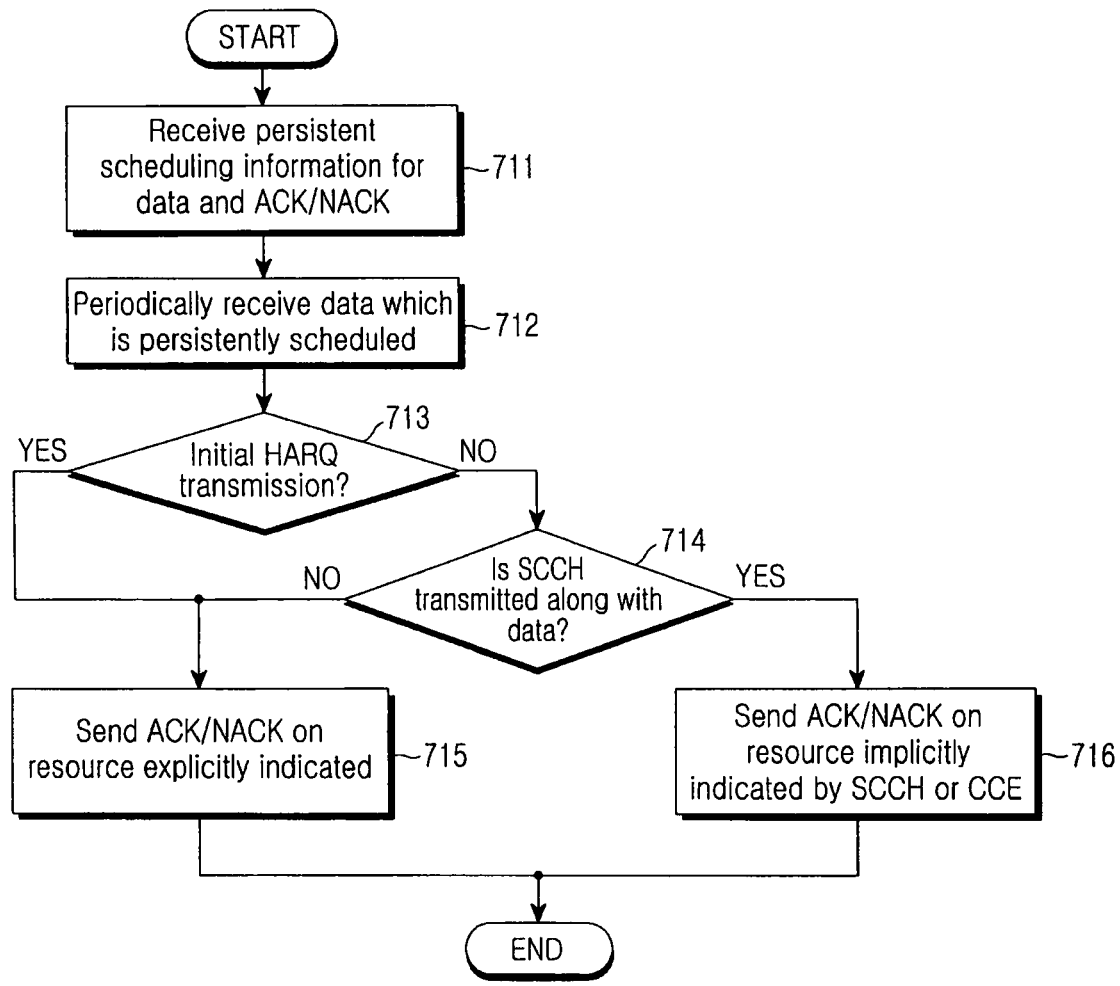
FIG. 7B is a flowchart of an operation of the UE during HARQ transmission in the case of persistent scheduling according to the present invention.

FIG. 7B is a flowchart of an operation of the UE when it transmits an ACK/NACK on the uplink for a persistently scheduled downlink data channel according to the present invention.

Referring to FIG. 7B, the UE receives persistent scheduling information that persistently schedules resources for a downlink data channel and an uplink ACKCH by L1/L2 signaling or high-layer signaling in step 711. That is, the persistent scheduling information includes ACK/NACK resource indication information for the uplink ACKCH. In step 712, the UE receives a data packet periodically on the persistently scheduled data channel according to the persistent scheduling information.

In step 713, the UE determines whether the data packet is an initial HARQ transmission packet or an HARQ retransmission packet. In the case of the initial HARQ transmission, the UE proceeds to step 715 and in the case of the HARQ retransmission, the UE goes to step 714. In step 715, the UE transmits an ACK/NACK for the data packet in the ACK/NACK resources explicitly indicated in step 701. In step 714, the UE determines whether the persistent scheduling information has been received together with the data packet. If they have been received separately, the UE transmits an ACK/NACK for the data packet in the ACK/NACK resources explicitly indicated in step 701 in step 715. If they have been received together, the UE transmits an ACK/NACK on an ACKCH mapped to the SCCH or a CCE of the SCCH in step 716.

Figure 8:
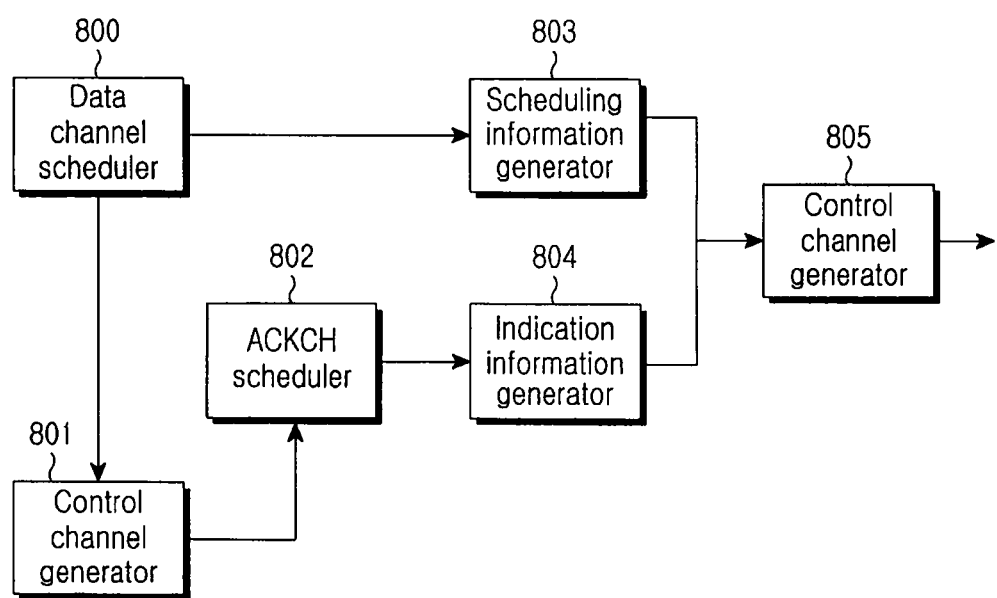
FIG. 8 is a block diagram of a Node B apparatus according to the present invention.

FIG. 8 is a block diagram of an apparatus of the Node B according to the present invention.

Referring to FIG. 8, a data channel scheduler 800 determines radio resources and MCS levels for data by scheduling data channels. A scheduling information generator 803 generates scheduling information representing the determination results of the data channel scheduler 800 and a control channel generator 805 channel-encodes the scheduling information and transmits it on an SCCH. The scheduling information can be transmitted by L1/L2 signaling or high-layer signaling.

A controller 801 determines to use ACK/NACK resources implicitly mapped to SCCHs for non-persistently scheduled data channels. For persistently scheduled data channels, the controller 801 determines that ACK/NACK resources need to be allocated within a flexible-size resource group. The controller 801 notifies an ACKCH scheduler 802 of the determination.

The ACKCH scheduler 802 determines resource allocation for ACKCHs for the data channels. It does not schedule ACKCHs for the non-persistently scheduled data channels and allocates only resources for ACKCHs in the flexible-size resource group for the persistently scheduled data channels, under the control of the controller 801. An indication information generator 804 generates ACK/NACK resource indication information explicitly indicating the determination of the ACKCH scheduler 802. The control channel generator 805 channel-encodes the ACK/NACK resource indication information and transmits it by L1/L2 scheduling or high-layer scheduling.

Figure 9:
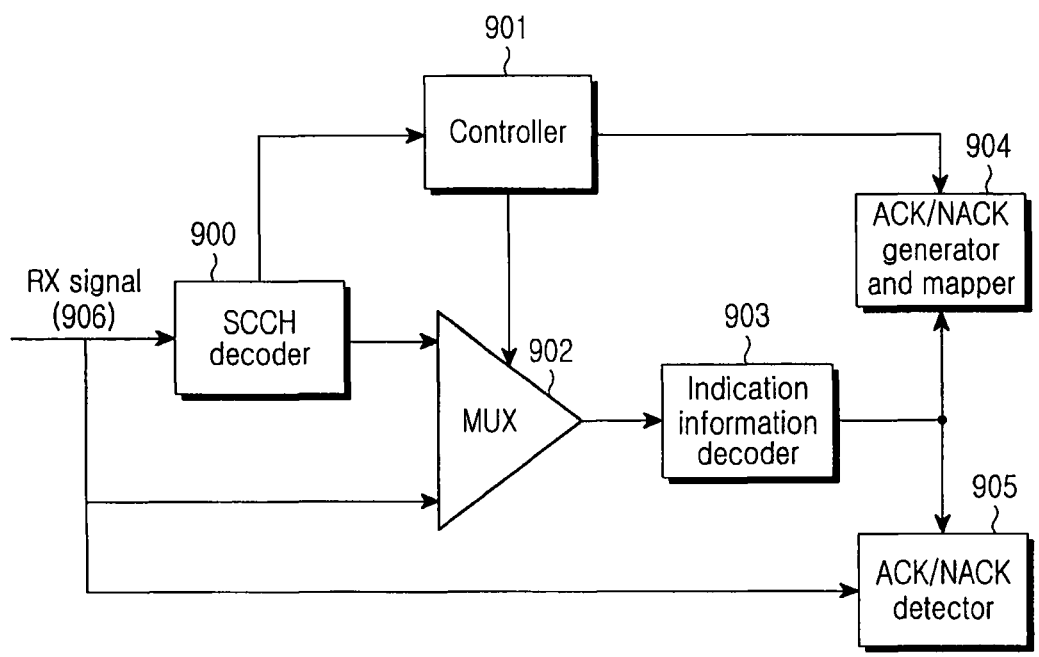
FIG. 9 is a block diagram of a UE apparatus according to the present invention.

FIG. 9 is a block diagram of a receiver of the UE according to the present invention.

Referring to FIG. 9, an SCCH decoder 900 detects an SCCH signal mapped to SCCH resources from a received (RX) signal 906 and acquires scheduling information by decoding the SCCH signal. When the decoding of the scheduling information is successful, a controller 901 determines whether the scheduling information indicates a persistent or non-persistent scheduling type. In the case of the persistent scheduling type, the controller 901 controls a Multiplexer (MUX) 902 according to an ACK/NACK resource signaling scheme to provide a signaling signal indicating ACK/NACK resources in the received signal to an indication information decoder 903. If the ACK/NACK resource signaling signal is included in the scheduling information, the MUX 902 selects the scheduling information and provides it to the indication information decoder 903.

The indication information decoder 903 acquires the ACK/NACK resource indication information by decoding the signaling signal included in the scheduling information. During downlink data reception, the ACK/NACK resource indication information is used for an ACK/NACK generator and mapper 904 to generate an ACK/NACK for downlink data and map the ACK/NACK to ACK/NACK resources. For uplink data transmission, the ACK/NACK resource indication information is used for an ACK/NACK detector 905 to detect an ACK/NACK mapped to the ACK/NACK resources from the RX signal 906.

In the case of the non-persistent scheduling, the controller 901 detects ACK/NACK resources implicitly mapped to the SCCH indicating resources for the non-persistently data channel and notifies the ACK/NACK generator and mapper 904 of the ACK/NACK resources for use in ACK/NACK transmission or reception.

Embodiment 2

Figure 10:
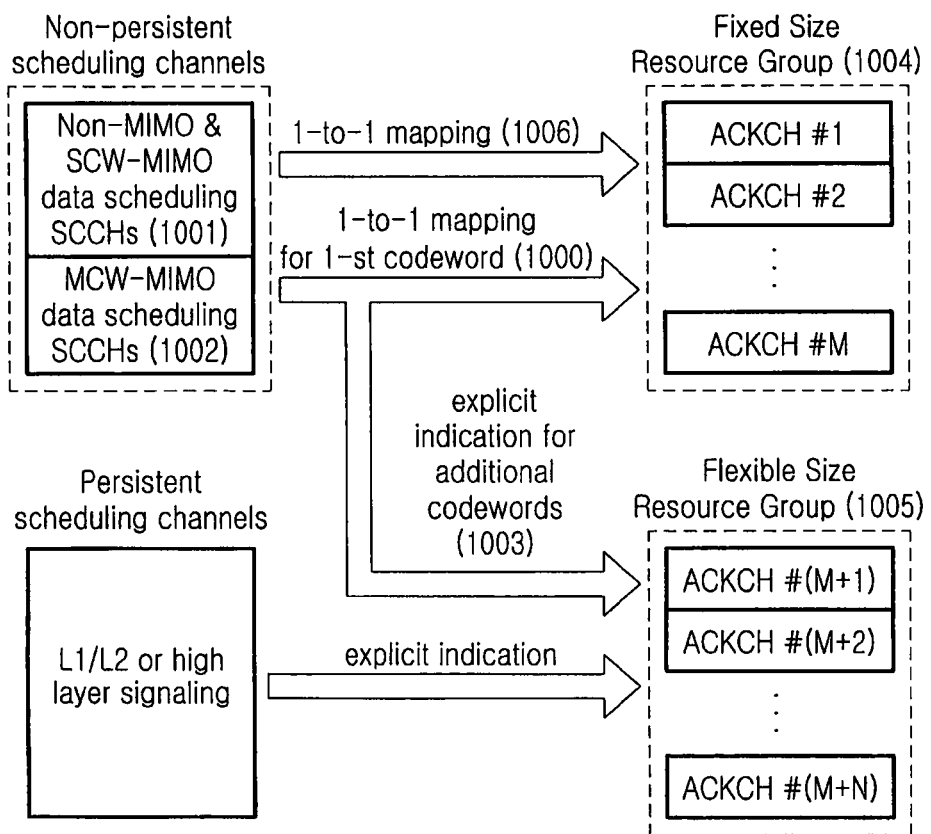
FIG. 10 illustrates an ACK/NACK resource allocation scheme in a Multiple Input Multiple Output (MIMO) system according to another embodiment of the present invention.

FIG. 10 illustrates an ACK/NACK resource allocation scheme for a MIMO system according to another embodiment of the present invention.

MIMO schemes are categorized into Single CodeWord MIMO (SCW-MIMO) and Multi-CodeWord MIMO (MCW-MIMO). In MCW-MIMO in which a transmitter transmits a plurality of codewords simultaneously, decoding is performed for each codeword. Hence, as many ACKCHs as the transmitted codewords are needed. As illustrated in FIG. 10, therefore, an ACKCH for at least one (e.g. the first codeword) of codewords on an MCW-MIMO data channel that is non-persistently scheduled uses ACK/NACK resources mapped to the index of an SCCH for the first codeword, as indicated by reference numeral 1000, whereas ACK/NACK resources for the remaining codewords are explicitly signaled along with SCCHs 1002 for the non-persistently scheduled MCW-MIMO data channels, as indicated by reference numeral 1003. The ACK/NACK resources share a flexible-size resource group 1005 with ACKCHs for persistently scheduled data channels.

That is, for non-persistent scheduling of MCW-MIMO data, the Node B allocates part of the flexible-size ACK/NACK resources 1005 for codewords to which ACK/NACK resources have not been allocated, taking into account the allocation status of the ACK/NACK resources 1005 on a TTI basis, as indicated by reference numeral 1003. The sharing of the resource group 1005 between ACKCHs for non-persistently scheduled MCW-MIMO data channels and ACKCHs for persistently scheduled MCW-MIMO data channels leads to efficient use of radio resources.

For non-MIMO and SCW-MIMO data channels, ACK/NACK resources implicitly signaled by the indexes of SCCHs 1001 are used as indicated by reference numeral 1006, as described before. Therefore, ACKs/NACKs for the non-MIMO and SCW-MIMO data channels are transmitted on ACKCHs within a fixed-size resource group 1004.

Embodiment 3

Figure 11:
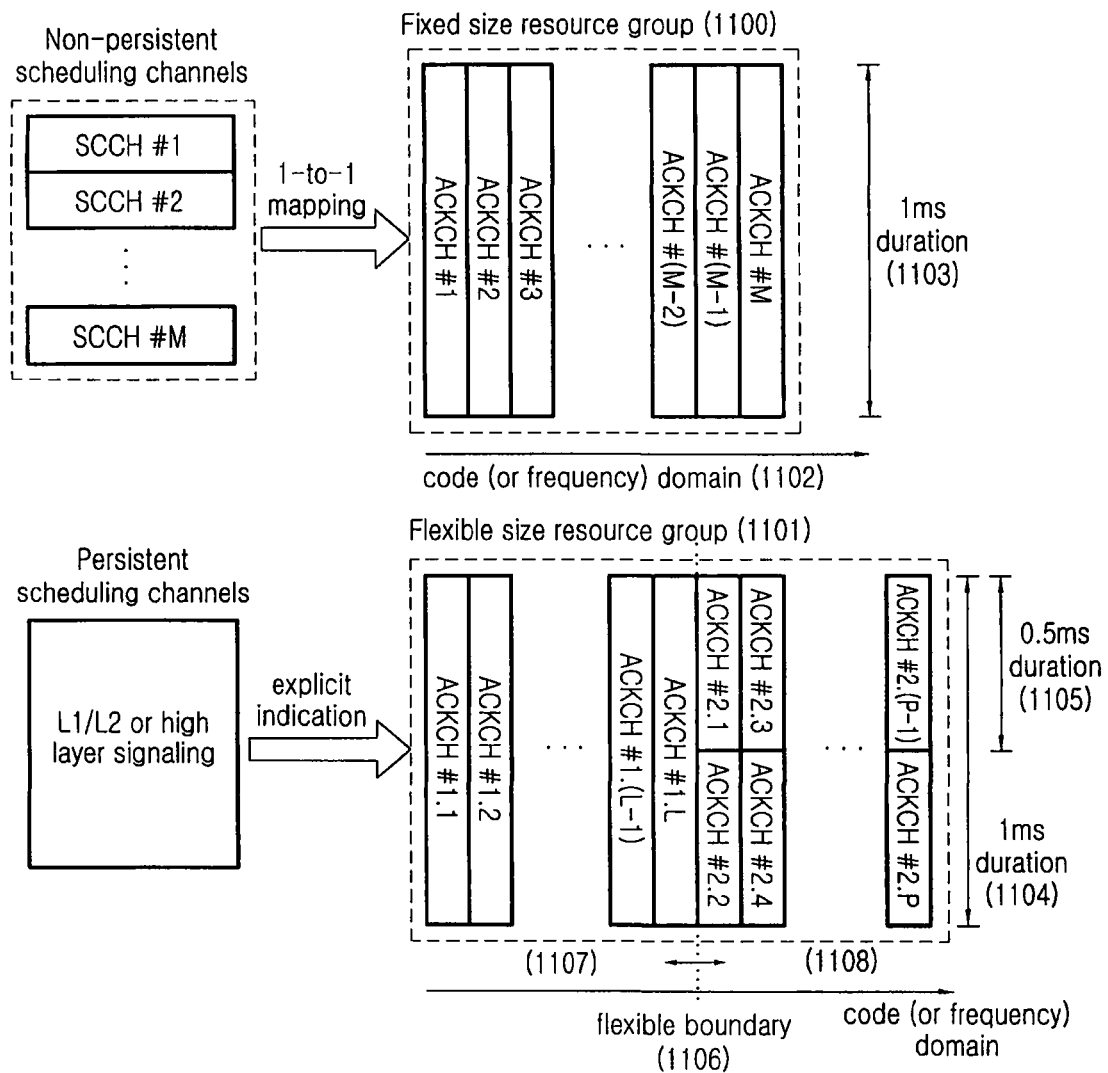
FIG. 11 illustrates an ACK/NACK resource allocation scheme considering cell coverage according to a third embodiment of the present invention.

FIG. 11 illustrates an ACK/NACK resource allocation scheme according to a third embodiment of the present invention. ACK/NACK resources are allocated, taking into account of the cell coverage of ACKCHs. Herein, the 3GPP EUTRA standards are considered, in which a 1-ms TTI is defined.

The cell coverage of an ACKCH is defined as a cell radius in which the ACKCH is stably detected. To expand cell coverage for a limited maximum transmit power, it is necessary to increase the reception energy of an ACKCH at a receiver by increasing the transmission duration of the ACKCH. However, as the transmission duration of the ACKCH increases, the amount of resources that the ACKCH occupies increases proportionally.

Therefore, for efficient use of radio resources, a flexible-size resource group 1101 for persistently scheduled data channels is divided into a first resource group 1107 having a transmission duration of 1 ms and a second resource group 1108 having a transmission duration of 0.5 ms. ACKCH #2.x with the 0.5-ms transmission duration 1105 or ACKCH #1.x with the 1-ms transmission duration 1104 is allocated to a UE that is subject to persistent scheduling. The transmission duration of the allocated ACKCH is indicated by ACK/NACK resource indication information, or preset between the system and the UE according to the position of ACK/NACK resources or the index of the ACKCH.

For a UE near to the Node B, which has sufficient transmit power, the Node B instructs the UE to transmit an ACK/NACK for 0.5 ms with high power by allocating ACKCH #2.x within the second resource group 1108, thus reducing ACK/NACK resource overhead. For a UE at a cell boundary, which does not have sufficient transmit power, the Node B increases the reception energy of an ACKCH by allocating ACKCH #1.x within the first resource group 1107 to the UE, thus increasing ACK/NACK detection probability. The Node B can determine whether the UE is near or at the cell boundary by a channel status reported by the UE, the signal strength of a signal received form the UE, or the geographical location of the UE.

A boundary 1106 between the first and second resource groups 1107 and 1108 is variable for each cell and for each TTI. The ACKCHs of the second resource group 1108 are not always transmitted continuously for 0.5 ms. For example, ACKCH #2.1 and ACKCH #2.2 are transmitted alternately during non-successive two 2.5-ms durations and frequency hopping can take place during the next 0.5-ms period. For example, ACKCH #1 is transmitted during non-successive time periods between 0 and 0.25 ms and between 0.5 and 0.75 ms and ACKCH #2 is transmitted during non-successive time periods between 0.25 and 0.5 ms and between 0.75 and 1 ms. For the first 0.5-ms period, ACKCH #1 and ACKCH #2 are transmitted in first frequency resources (e.g. RU #1) and for the next 0.5-ms period, they are hopped to second frequency resources (e.g. RU #50). In this case, the total transmission duration of ACKCH #2.x is 0.5 ms, but since the transmission is non-successive and frequency-hopped, time and frequency diversities are achieved. The flexible-size ACK/NACK resources 1101 can be shared between CQICHs and ACKCHs for MCW-MIMO data channels as well as ACKCHs for persistently scheduled data.

On the other hand, since ACKCHs for non-persistently scheduled data channels are dynamically allocated according to the indexes of SCCHs in every TTI, the ACKCHs of a fixed-size resource group 1100 have commonly a 1-ms transmission duration 1103 to prevent a cell coverage problem. The ACKCHs of the fixed-size resource group 1100 can be multiplexed in a code or frequency domain 1102.

Embodiment 4

Figure 12:
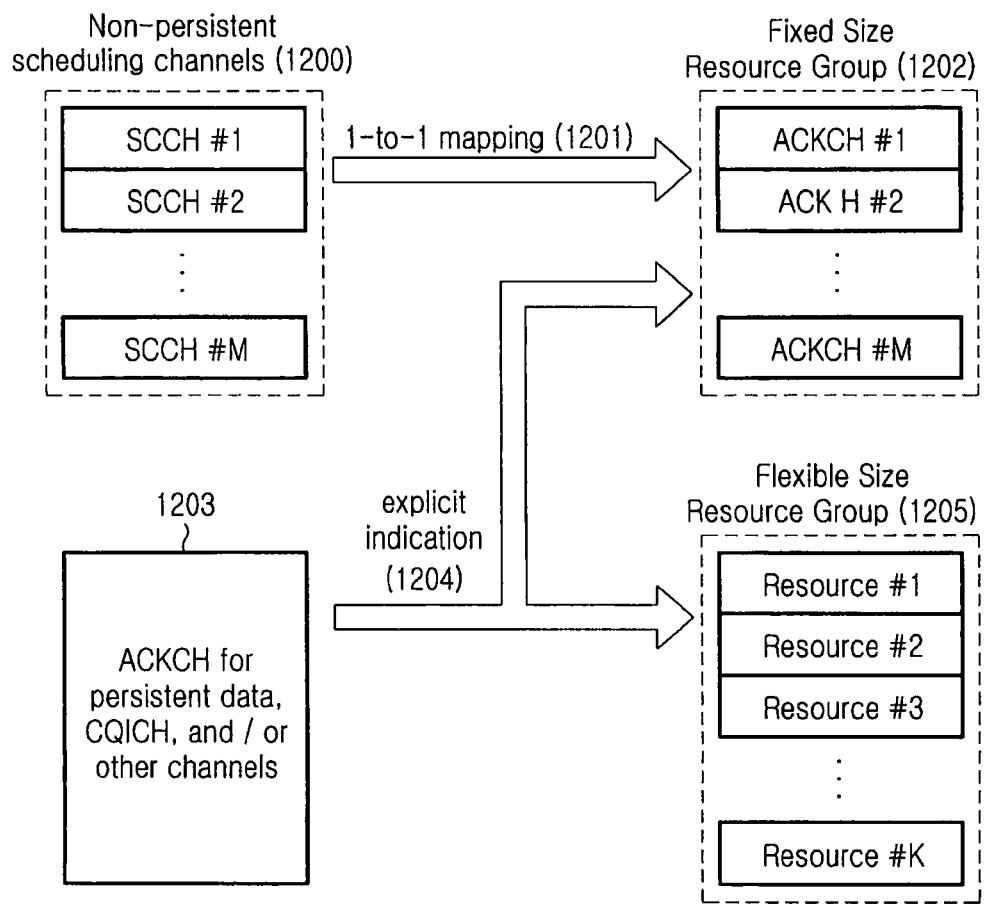
FIG. 12 illustrates an ACK/NACK resource allocation scheme according to a fourth embodiment of the present invention.

FIG. 12 illustrates an ACK/NACK resource allocation scheme according to a fourth embodiment of the present invention.

Referring to FIG. 12, ACKs/NACKs for non-persistently scheduled data channels use ACK/NACK resources of a fixed-size resource group 1202 mapped to SCCHs for the data channels, as in the first exemplary embodiment of the present invention. ACK/NACK resources can be mapped to at least one CCE forming an SCCH, instead of the SCCH. In this case, an ACKCH for a data channel indicated by the SCCH uses resources corresponding to at least one of the CCEs forming the SCCH and the UE implicitly finds out the ACK/NACK resources by the CCE index.

As compared to the first embodiment of the present invention, the fourth embodiment of the present invention is characterized in that resources of the fixed-size resource group 1202 as well as those of a flexible-size resource group 1205 are available to at least one of ACKCHs for persistently scheduled data channels, CQICHs, and other channels.

For example, when a small number of SCCHs are used due to a small number of active UEs in a cell or a small number of scheduled UEs for a TTI, much resources remain except for ACK/NACK resources mapped to used SCCHs in the fixed-size resource group 1202. In this case, the Node B allocates the remaining resources and the flexible-size resource group 1205 to UEs by explicit indication 1204, so that the remaining resources are used for transmission of at least one of ACKCHs for persistently scheduled data channels, CQICHs, and other channels. The UEs use the remaining resources for ACKCHs for persistently scheduled data channels, CQICHs, and other channels.

As is apparent from the above description, the present invention increases resource use efficiency and reduces signaling overhead by applying an appropriate ACK/NACK resource allocation and signaling scheme according to a non-persistent scheduling type or a persistent scheduling type for data. The resulting increase in resources available for transmission increases system capacity.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method performed by a user equipment in a wireless communication system, the method comprising:
   receiving, from a base station, data on a downlink data channel;
   determining whether a scheduling type of the downlink data channel is persistent or non-persistent; and
   transmitting, to the base station, acknowledgement/negative acknowledgement (ACK/NACK) information for the data,
   wherein, when the scheduling type is non-persistent, the ACK/NACK information is transmitted on a first resource determined according to a downlink control channel corresponding to the data, and
   wherein, when the scheduling type is persistent the ACK/NACK information for an initial persistent data transmission is transmitted on a second resource determined according to the downlink control channel, and
   the ACK/NACK information for a following persistent data transmission is transmitted on a third resource determined by using resource information received via high-layer signaling.

2. The method of claim 1, wherein the first resource is further determined based on an index of a resource for the downlink control channel.

3. The method of claim 1, wherein the determination of the scheduling type is based on a part of control information on the downlink control channel.

4. The method of claim 3, wherein the control information includes resource allocation information for the data and modulation and coding scheme (MCS) information for the data.

5. A user equipment in a wireless communication system, the user equipment comprising:
   a transceiver; and
   a controller configured to:
      receive, from a base station via the transceiver, data on a downlink data channel;
      determine whether a scheduling type of the downlink data channel is persistent or non-persistent; and
      transmit, to the base station via the transceiver, acknowledgement/negative acknowledgement (ACK/NACK) information for the data,
   wherein, when the scheduling type is non-persistent, the ACK/NACK information is transmitted on a first resource determined according to a downlink control channel corresponding to the data, and
   wherein, when the scheduling type is persistent, the ACK/NACK information for an initial persistent data transmission is transmitted on a second resource determined according to the downlink control channel, and
   the ACK/NACK information for a following persistent data transmission is transmitted on a third resource determined by using resource information received via high-layer signaling.

6. The user equipment of claim 5, wherein the first resource is further determined based on an index of a resource for the downlink control channel.

7. The user equipment of claim 5, wherein the determination of the scheduling type is based on a part of control information on the downlink control channel.

8. The user equipment of claim 7, wherein the control information includes resource allocation information for the data and modulation and coding scheme (MCS) information for the data.

9. A method performed by a base station in a wireless communication system, the method comprising:
   determining a scheduling type of a downlink data channel as either persistent or non-persistent;
   transmitting, to a user equipment, data on the downlink data channel based on the determination; and
   receiving, from the user equipment, acknowledgment/negative acknowledgment (ACK/NACK) information for the data,
   wherein, when the scheduling type is non-persistent, the ACK/NACK information is received on a first a resource determined according to a downlink control channel, and
   wherein, when the scheduling type is persistent, the ACK/NACK information for an initial persistent data transmission is received on a second resource determined according to the downlink control channel, and
   the ACK/NACK information for a following persistent data transmission is received on a third resource determined by using resource information transmitted via-a high-layer signaling.

10. The method of claim 9, wherein the first resource is further determined based on an index of a resource for the downlink control channel.

11. The method of claim 9, wherein the scheduling type is associated with a part of control information on the downlink control channel.

12. The method of claim 11, wherein the control information includes resource allocation information for the data and modulation and coding scheme (MCS) information for the data.

13. A base station in a wireless communication system, the base station comprising:
   a transceiver; and
   a controller configured to:
      determine a scheduling type of a downlink data channel either persistent or non-persistent;
      transmit, to a user equipment via the transceiver, data on the downlink data channel based on the determination; and
      receive, from the user equipment via the transceiver, acknowledgement/negative acknowledgement (ACK/NACK) information for the data,
   wherein, when the scheduling type is non-persistent, the ACK/NACK information is received on a first resource determined according to a downlink control channel, and wherein, when the scheduling type is persistent, the ACK/NACK information for an initial persistent data transmission is received on a second resource determined according to the downlink control channel, and the ACK/NACK information for a following persistent data transmission is received on a third resource determined by using resource information transmitted via high-layer signaling.

14. The base station of claim 13, wherein the first resource is further determined based on an index of a resource for the downlink control channel.

15. The base station of claim 13, wherein the scheduling type is associated with a part of control information on the downlink control channel.

16. The base station of claim 15, wherein the control information includes resource allocation information for data and modulation and coding scheme (MCS) information for the data.

\* \* \* \* \*